United States Patent [19]
Oury

[11] 3,844,646
[45] Oct. 29, 1974

[54] PROJECTION APPARATUS
[76] Inventor: Claude Oury, Quai Orban 12, 4000 Liege, Belgium
[22] Filed: June 26, 1973
[21] Appl. No.: 373,855

[30] Foreign Application Priority Data
June 28, 1972 Belgium .............................. 785520

[52] U.S. Cl........................ 353/86, 328/6, 352/68, 352/133, 353/94
[51] Int. Cl. ......................................... G03b 21/26
[58] Field of Search .................. 353/85, 86, 15, 94; 352/133, 68; 328/6

[56] References Cited
UNITED STATES PATENTS
3,282,155  11/1966  Cleary et al. ........................ 353/86
3,622,236  11/1971  Novy.................................... 353/86

FOREIGN PATENTS OR APPLICATIONS
904,321  8/1962  Great Britain........................ 353/85

Primary Examiner—Louis R. Prince
Assistant Examiner—Steven L. Stephan
Attorney, Agent, or Firm—Robert E. Burns; Emmanuel J. Lobato; Bruce L. Adams

[57] ABSTRACT

A device for projecting diapositives or transparent slides in cross fade. The device is associated with two projectors each comprising a projection lamp, a magazine containing diapositives, and mechanism for automatically advancing the magazine and the diapositives. Provision is made for separate or simultaneous control of the illumination of the lamps and of the respective advancing mechanisms. The device includes a generator of first and second command signals having first and second variable frequencies in distinct first and second ranges. The device also includes a decoding unit having an input connected to the output of the generator and which provides command signals for controlling respectively the illumination of the lamps and the advancement of the magazines. The decoding unit comprises two channels each associated with a projector, each channel comprising successively a selective amplifier, a converter of the voltage-frequency type and a power stage. The output of the power stage is connected to one of the lamps. The decoding unit also comprises two relays for detecting interruption of the command signals from the selective amplifiers and correlatively controlling the advancing mechanisms.

7 Claims, 1 Drawing Figure

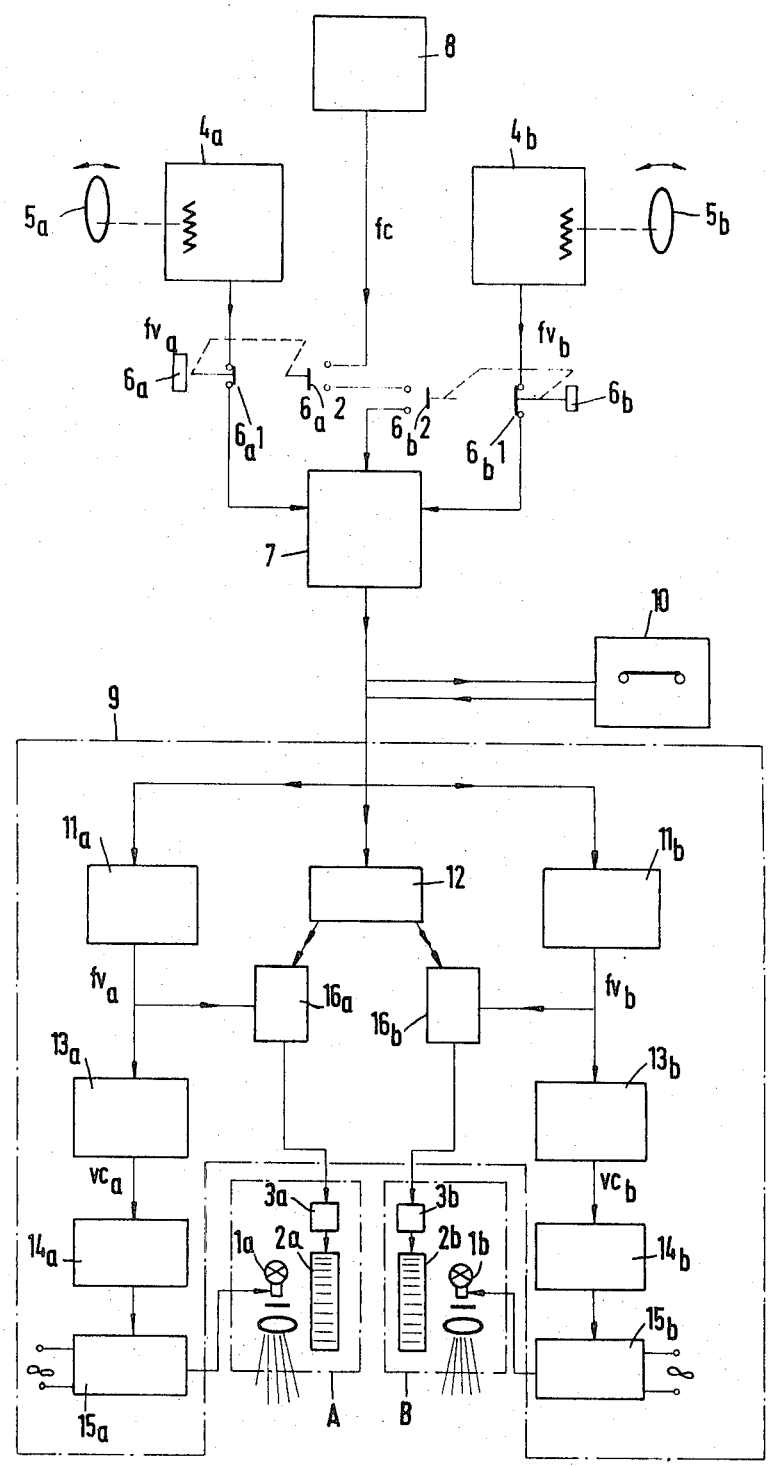

PROJECTION APPARATUS

BACKGROUND OF THE INVENTION

This invention relates to a device for projecting diapositives or transparent slides in cross fade.

Such devices at present placed at the disposal of photographers may be classified into three categories; equipment which is manually operated, entirely automatic equipment, and equipment with automatic reproduction. In the latter type, so far as at present known, two projectors are always associated or connected together: it is an object of the present invention on the contrary, to make provision for leaving to the projectionist the appreciation of the quality of the third image resulting from the simultaneous projection of two diapositives, by providing a separate or simultaneous control of the illumination of the lamps of the projection equipment and of the respective advancing mechanisms of the magazines containing the diapositives.

SUMMARY OF THE INVENTION

According to the present invention there is provided a device for projecting diapositives in cross fade, in combination with two projectors each comprising a projection lamp, a diapositives magazine, and automatic means for advancing the magazine and the diapositives, said device comprising a generator of first and second signals having first and second variable frequencies in distinct first and second ranges, and a decoding unit having an input connected to the output of the generator of said first and second signals and which provides further signals for controlling respectively the luminous intensity of the projector lamps and the advancement of the magazines of these projectors, said decoding unit comprising first and second parallel channels associated respectively with the first and second projectors and each comprising successively a selective amplifier, a converter of the voltage-frequency type, and a power stage, the power stage having an input to which there is applied the output voltage from said converter and an output connected to the associated projector lamp, said decoding unit also comprising means for detecting the interruption of each of the outputs from the selective amplifiers and for correlatively controlling the advancement means for the magazines of the two projectors.

After several experiments, it is possible to determine a code which may be memorised on a single portion of a magnetic tape, for example track 3 of a tape recorded by means of a four-track stereo recorder, the lower track of a tape recorded by means of a two-track stereo recorder, or again track two of a tape recorded by means of a four-track recorder to which there has been added a second head which may, for example, be that of a Tops box as used at the present time in controlling the advance motion of the magazine of a projector.

BRIEF DESCRIPTION OF THE DRAWING

There will now be described, as a non-restrictive example, an embodiment of the present invention, with reference to the accompanying Drawing which is a synoptic diagram of a device enabling diapositives to be projected in cross fade.

DESCRIPTION OF PREFERRED EMBODIMENT

The device device according to the invention is associated with two slide projectors A and B, shown diagrammatically on the drawing, which comprise respectively lamps $1_a$, $1_b$, slide magazines $2_a$, $2_b$, and means $3_a$, $3_b$, which control respectively the advancing motion of these magazines and the alternating movement of each slide into the projection position between the corresponding lamp and the optical system of the projector.

In the description below, the suffix $a$ attached to the reference number indicates all the elements associated with the projector A, and similarly the suffix $b$ all those associated with the projector B.

The device according to the invention comprises a command signal generator comprising two oscillators $4_a$, $4_b$, which emit respectively from their outputs variable frequency signals $fv_a$, $fv_b$.

The oscillarors $4_a$, $4_b$, are of any suitable type and are provided with means enabling the frequency of their output signals to be varied linearly. These oscillators are respectively controlled by levers $5_a$, $5_b$ acting upon an adjustable element of the oscillator, such as a linear or rotary potentiometer.

The oscillator $4_a$ produces, for instance, an output signal $fv_a$ having a frequency which varies linearly in the range from 1,000 to 2,000 Hz. Similarly, the oscillator $4_b$ emits an output signal $fv_b$ having a frequency which varies in a range different from the foregoing, for example 4,500 to 6,000 Hz.

The adjusting levers $5_a$, $5_b$ for the oscillators $4_a$, $4_b$ form part of a control panel and may be actuated by the operator, either separately or together by coupling them mechanically together. Where the oscillators $4_a$, $4_b$ comprise linear potentiometers, the coupling device for the two levers $5_a$, $5_b$ may be formed by arranging these two linear potentiometers parallel to each other and by positioning a rider which firmly fixes together the cursors of the two potentiometers. Where the oscillators use rotary potentiometers with coaxial shafts, the coupling may be effected by locking the shafts of the potentiometers together.

As has already been stated above, the frequency variations, as a function of the position of the levers $5_a$, $5_b$, are linear, that is to say in the particular case of the numerical example given above, the frequency values of the signals $fv_a$ and $fv_b$ are respectively 1,500 and 5,250 Hz, when the arms of the levers are situated in their mean position.

The variable frequency signals $fv_a$ and $fv_b$ of the oscillators $4_a$, $4_b$ are respectively applied to two inputs of a mixer 7, through two break contacts $6_a1$, $6_b1$, of two push-buttons respectively $6_a$, $6_b$, which form part of the control panel.

The push-buttons $6_a$, $6_b$, comprise respectively second make contacts $6_a2$, $6_b2$, connected in series between the output of a third oscillator 8, operating at constant frequency, and a third input to the mixer 7.

The signal fc which appears at the output from the oscillator 8 is thus applied to the input of the mixer 7 when pressure is simultaneously applied to the two push-buttons $6_a$, $6_b$, to close the two series contacts $6_a2$, $6_b2$. The constant frequency of the signal fc is selected outside the operating ranges of the two variable frequency signals $fv_a$, $fv_b$.

The signal which appears at the output of the mixer 7 is applied to a decoding unit designated as a whole by the reference 9, which regulates the intensity of the lamps $1_a$, $1_b$ and of the devices $3_a$, $3_b$ which control the advance motion of the magazines $2_a$, $2_b$. The output from the mixer 7 may also be connected to a magnetic tape recorder 10, which is also capable of exercising the function of a generator of control signals from a tape recording.

The decoding unit 9 comprises three amplifiers $11_a$, $11_b$ and 12, the inputs of which are connected together to the output of the mixer 7. The amplifiers $11_a$, $11_b$ are selective amplifiers which amplify respectively the signals $fv_a$ and $fv_b$. The output signals $fv_a$, $fv_b$, after they have been subjected to their selective amplification, are applied respectively to the inputs of two converter units $13_a$, $13_b$ of the frequency-voltage type, which supply at their output two distinct direct voltages, respectively $vc_a$ and $vc_b$. These control voltages $vc_a$ and $vc_b$ are applied respectively to the inputs of two command modules $14_a$, $14_b$, the outputs of which are connected to two power stages $15_a$, 15b, with triacs or thyristors, which supply respectively the two lamps $1_a$, $1_b$ at variable intensities.

The decoding unit 9 comprises in addition two relays $16_a$, $16_b$, each having two inputs, one of these being connected to the output fo the corresponding selective amplifier $11_a$ or $11_b$ and the other to an output of the controlamplifier 12. These relays $16_a$, $16_b$ change state respectively only when the respective signal $fv_a$ or $fv_b$ is interrupted, and simultaneously, if the control amplifier 12 receives a signal at its input.

The relays $16_a$, $16_b$ control respectively the devices $3_a$, $3_b$ which operate the advance motion of the magazines $2_a$, $2_b$ of the projectors A and B. The functioning of the device just described is as follows:

As has already been seen, the operator has at his disposal a control panel upon which are located the two levers $5_a$, $5_b$ and the two push-buttons $6_a$, $6_b$. By moving one or other of the levers $5_a$, $5_b$, the operator can vary the frequency of the corresponding oscillator $4_a$, $4_b$ and consequently that of the output signal $fv_a$ or $fv_b$. This signal is transmitted, via the break contact $6_a1$ or $6_b1$, to the mixer and to the decoding unit 9. At the output from the corresponding selective amplifier $11_a$ or $11_b$, the signal $fv_a$ or $fv_b$ is applied to the relay $16_a$ or $16_b$ and to the converter $13_a$ or $13_b$. This results, at the output of the latter, in a voltage $vc_a$ or $vc_b$ of a magnitude which varies with the frequency of the input signal, and this voltage signal, applied across the module $14_a$ or $14_b$, controls the state of the triac or thyristors $15_a$ or $15_b$ to cause a variation in the illumination of the corresponding projector A or B.

The maximum illumination levels of the projectors A and B correspond to the highest frequencies of the respective signals $fv_a$ and $fv_b$, while the complete extinctions of the lamps correspond to the lowest frequencies of the same signals.

As has already been seen, the variation ranges of the frequencies of the two signals $fv_a$ ans $fv_b$ are distinct and are so selected that it is possible to mix them and subsequently to separate them again.

It is thus possible for the operator to vary the luminous intensity of the lamps $1_a$, $1_b$ of the projectors A and B as desired, by moving the levers $5_a$ and $5_b$.

It is thus possible to achieve the desired aesthetic effect by combining with different intensities the two images coming from the two projectors A and B.

The push buttons $6_a$ and $6_b$ are at the disposal of the operator to cause the advance motion of the respective magazines $2_a$, $2_b$ by momentarily interrupting the signals $fv_a$ and $fv_b$. It should be noted that, for reasons of safety, the advancing of the magazine $2_a$ of projector A is only carried out by interrupting the signal $fv_a$, provided that the signal $fv_b$ exists at that precise instant. In fact, in order to change state, the relay $16_a$ must, when it detects the interruption of the signal $fv_a$ at the output from the amplifier $11_a$, receive a signal from the output of the control amplifier 12. Consequently, when the contact $6_a1$ is caused to open by actuating the push-button $6_a$, with the contact $6_b1$ remaining closed, the signal $fv_b$ is transmitted through the mixer 7 to the amplifier 12 and consequently, the relay $16_a$ can change state when it detects the interruption of the signal $fv_a$ at the output from the amplifier $11_a$, in order to command the advancing motion of the magazine $2_2$.

The functioning is identical with regard to projector B.

The oscillator 8 producing the constant frequency signal $fc$ has been provided to enable the two magazines $2_a$, $2_b$ to be advanced simultaneously, if desired. In this case, the operator presses simultaneously on the two push-buttons $6_a$, $6_b$, thus opening the contacts $6_a1$, $6_b1$ and thereby suppressing the transmission of the signals $fv_a$, $fv_b$ to the mixer 7. However, the contacts $6_a2$ and $6_b2$ are closed, so that the signal fc is applied to the mixer 7.

A signal therefore appears at the two outputs from the control amplifier 12, so that the two relays $16_a$, $16_b$ can simultaneously detect the interruption to the signals $fv_a$, $fv_b$ at the outputs respectively from the amplifiers $11_a$, $11_b$; this leads to the simultaneous advancing of the magazines $2_a$, $2_b$.

The purpose of the presence of the third signal or control signal fc is to check that the interruption in the signals $fv_a$ and $fv_b$ is not due to a perturbation cause such as, for example, an undulation or a hole in the magnetic tape, when the recorder 10 is used to supply the decoding unit 9.

It can thus be seen from the foregoing that a coded signal appears at the output from the mixer 7 constituted of the variable frequency signals $fv_a$, $fv_b$, and possibly of the constant frequency signal $fc$, this coded signal being capable of being recorded upon magnetic tape in the recorder 10 to be subsequently re-used for the automatic operation of the two projectors A and B.

I claim:

1. A device for projecting diapositives in cross fade, in combination with two projectors each comprising a projection lamp, a diapositives magazine, and automatic means for advancing the magazine and the diapositives, said device comprising a generator of first and second signals having first and second variable frequencies in distinct first and second ranges, and a decoding unit having an input connected to the output of the generator of said first and second signals and which provides further signals for controlling respectively the luminous intensity of the projector lamps and the advancement of the magazines of these projectors, said decoding unit comprising first and second parallel channels associated respectively with the first and second projectors and each comprising successively a selective amplifier, a converter of the frequency-voltage type, and a power stage, the power stage having an input to which there is applied the output voltage from said converter and an output connected to the associated projector lamp, said decoding unit also comprising means for interrupting the output from each of the selective amplifiers and means for detecting the interruption of each of the outputs from the selective amplifiers and for correlatively controlling the advancement means for the magazines of the two projectors.

2. The combination claimed in claim 1, in which said generator comprises first and second variable frequency oscillators having outputs respectively supplying said first and second signals, first and second manually-operated adjusting means to cause selective variations in the frequencies of said first and second oscillators, and a mixer comprising first and second inputs connected respectively to the outputs of the first and second oscillators, and an output connected to the input of the decoding unit.

3. The combination claimed in claim 2, in which said adjusting means for adjusting the oscillators comprise first and second levers and potentiometers, cursors of said potentiometers coupled to said levers.

4. The combination claimed in claim 2, comprising first and second manually-operated push-buttons, and first and second break contacts actuated respectively by the first and second push-buttons and connected respectively in series between the output from the first oscillator and the first input to the mixer on the one hand, and the output from the second oscillator and the second input to the mixer on the other hand.

5. The combination claimed in claim 4, comprising a third constant-frequency oscillator having an output supplying a control signal, a third input to the mixer, and first and second make contacts actuated respectively by the first and second push-buttons and connected in series between the output from the third oscillator and the third input to the mixer.

6. The combination claimed in claim 5, in which said decoding unit comprises a third control amplifier having an input connected to the output of the mixer, and in which said means detecting the interruption of the outputs from the selective amplifiers comprise first and second relays, each of said first and second relays having a first input connected to one output of the associated control amplifier and a second input connected to the output of the associated selective amplifier, whereby to switch over when a signal from first or second variable frequency oscillators is interrupted in the presence of a signal from the control amplifier.

7. The combination claimed in claim 1, in which said generator of first and second variable frequency signals is a magnetic tape recorder.

* * * * *